United States Patent
Anderson et al.

(10) Patent No.: US 8,813,797 B2
(45) Date of Patent: Aug. 26, 2014

(54) CONTROLLED BUCKLING OF A SHEAR BAND FOR A TIRE

(75) Inventors: Scott Powell Anderson, Greenville, SC (US); Ronald Hobart Thompson, Greenville, SC (US)

(73) Assignees: Compagnie Generale des Etablissements Michelin, Clermont-Ferrand (FR); Michelin Rescherche et Techniques S.A., Granges-Paccot (CH)

( * ) Notice: Subject to any disclaimer, the term of this patent is extended or adjusted under 35 U.S.C. 154(b) by 732 days.

(21) Appl. No.: 13/017,012

(22) Filed: Jan. 30, 2011

(65) Prior Publication Data

US 2012/0193004 A1    Aug. 2, 2012

(51) Int. Cl.
| | |
|---|---|
| *B60C 7/00* | (2006.01) |
| *B60C 7/10* | (2006.01) |
| *B60C 9/04* | (2006.01) |
| *B60C 7/22* | (2006.01) |
| *B60C 9/22* | (2006.01) |

(52) U.S. Cl.
CPC . *B60C 7/105* (2013.01); *B60C 7/22* (2013.01); *B60C 9/2204* (2013.01)
USPC .......... 152/41; 152/5; 152/11; 152/246; 152/310

(58) Field of Classification Search
USPC .............. 152/1, 5, 7, 11, 12, 41, 69, 80, 197, 152/246, 253, 270, 273, 302, 310, 323–327
See application file for complete search history.

(56) References Cited

U.S. PATENT DOCUMENTS

| | | | | |
|---|---|---|---|---|
| 2,033,862 | A * | 3/1936 | Piron | 295/11 |
| 4,108,228 | A * | 8/1978 | Tiemann | 152/7 |
| 5,082,713 | A | 1/1992 | Gifford | |
| 5,743,975 | A | 4/1998 | Sinopoli | |
| 6,112,791 | A * | 9/2000 | Spragg et al. | 152/533 |
| 6,148,885 | A * | 11/2000 | Spragg et al. | 152/197 |
| 6,405,773 | B1 * | 6/2002 | Vossberg et al. | 152/516 |
| 6,439,288 | B1 * | 8/2002 | Spragg et al. | 152/533 |
| 6,769,465 | B2 * | 8/2004 | Rhyne et al. | 152/197 |
| 6,983,776 | B2 * | 1/2006 | Thompson et al. | 152/197 |
| 6,994,134 | B2 * | 2/2006 | Grah | 152/197 |
| 7,013,939 | B2 * | 3/2006 | Rhyne et al. | 152/5 |
| 7,044,180 | B2 * | 5/2006 | Rhyne et al. | 152/158 |
| 7,201,194 | B2 * | 4/2007 | Rhyne et al. | 152/5 |
| 7,281,553 | B1 * | 10/2007 | Roesgen et al. | 152/197 |
| 7,418,988 | B2 * | 9/2008 | Cron et al. | 152/5 |
| 7,650,919 | B2 * | 1/2010 | Rhyne et al. | 152/246 |
| 8,109,308 | B2 * | 2/2012 | Manesh et al. | 152/326 |
| 8,176,957 | B2 * | 5/2012 | Manesh et al. | 152/326 |
| 8,215,351 | B2 * | 7/2012 | Thompson | 152/197 |
| 8,491,981 | B2 * | 7/2013 | Delfino et al. | 428/113 |
| 2006/0005903 | A1 | 1/2006 | Fry et al. | |
| 2008/0314486 | A1 * | 12/2008 | Manesh et al. | 152/328 |

(Continued)

FOREIGN PATENT DOCUMENTS

WO    2010071883    6/2010

*Primary Examiner* — Gregory Blankenship
(74) *Attorney, Agent, or Firm* — John Steckler Schwab

(57) ABSTRACT

This invention relates generally to shear band of a tire that has means for inducing buckling when the tire is subjected to high deformations, and, more specifically, to a tire that has a shear band with at least one membrane that has a reinforcement having predetermined configurations for controlling the buckling behavior of the reinforcement when the membrane is subjected to compressive stress.

14 Claims, 16 Drawing Sheets

(56) References Cited

U.S. PATENT DOCUMENTS

| | | | |
|---|---|---|---|
| 2011/0011506 A1 | 1/2011 | Manesh | |
| 2011/0240914 A1* | 10/2011 | Richardson et al. | 252/182.12 |
| 2012/0193004 A1* | 8/2012 | Anderson et al. | 152/310 |
| 2012/0216932 A1* | 8/2012 | Cron et al. | 152/246 |
| 2012/0234445 A1* | 9/2012 | Manesh et al. | 152/310 |
| 2012/0247635 A1* | 10/2012 | Manesh et al. | 152/326 |
| 2013/0048174 A1* | 2/2013 | Cron | 152/324 |

* cited by examiner

UNIFORM COMPRESSIVE STRESS

MODE 1 CRITICAL STRESS = 26.9 MPa

MODE 2 CRITICAL STRESS = 28.8 MPa

MODE 3 CRITICAL STRESS = 31.1 MPa

CONTROLLED BUCKLING OF A SHEAR BAND FOR A TIRE

BACKGROUND OF THE INVENTION

1. Field of the Invention

This invention relates generally to shear band of a tire that has means for inducing buckling when the tire is subjected to high deformations, and, more specifically, to a tire that has a shear band with at least one membrane that has a reinforcement having predetermined configurations for controlling the buckling behavior of the reinforcement when the membrane is subjected to compressive stress.

2. Description of the Related Art

An emerging field in tire development involves the manufacture and use of non-pneumatic or hybrid tires that do not depend solely on gas to support the tire structurally as these tires are not prone to deflation, which can render standard pneumatic tires inoperable. An example of such a tire is disclosed by U.S. Pat. No. 7,201,194, which is commonly owned by the applicant of the present application. The content of this patent is incorporated herein by reference for all purposes in its entirety. In an exemplary embodiment of the '194 patent, the non-pneumatic tire includes an outer annular shear band and a plurality of web spokes that extend transversely across and radially inward from the annular shear band and are anchored in a wheel or hub.

In certain embodiments, the annular shear band may further comprise a shear layer, at least a first membrane adhered to the radially inward extent of the shear layer and at least a second membrane adhered to the radially outward extent of the shear layer. The membranes may have reinforcing fibers made from steel, aramid or glass fibers or other suitable material that is substantially inextensible that are embedded in an elastomeric coating. The shear layer may include an elastomer that is rubber, polyurethane or any other suitable thermoset or thermoplastic material. The ratio of the extension or young's modulus ($E_{membrane}$) of either membrane to the shear modulus (G) of the shear layer is typically at least 100:1 and is sometimes as high as 3000:1 in order for the tire that has the shear band to mimic the performance of a pneumatic tire. For example, in addition to the ability to operate without a required inflation pressure, the invention of U.S. Pat. No. 7,201,194 also provides advantages that include a more uniform ground contact pressure throughout the length of the contact area. Hence, this tire mimics several performances of a pneumatic tire.

FIG. 1 shows such a tire 100 that defines a radial or vertical direction (R, Z), a circumferential or X direction (C, X), and an axial or Y direction (A, Y). The tire 100 comprises a tread 102 that is attached to the outward extent 104 of the spokes 106, which in turn, are connected to a hub or wheel 108 at their inward extent 110 by means known in the art such as by molding spokes between the hub 108 and the tread 102, which have been prepared for suitable bonding to the polyurethane. Alternatively, the tire could have sidewalls that extend from either side of the tread and that attach the tread to the hub using conventional bead interfaces. In use, such a tire works well when it rides on a relatively smooth road surface because the stress and strain that the shear band experiences is acceptably low.

For example, experience has taught that a typical deflection for such a tire used in an urban setting on an electrical urban vehicle is relatively small and can increase the length of the footprint to about 75 mm. However, occasionally a larger deflection is imposed on the tire that increases the length of the footprint to as much as 150 mm such as when the tire encounters a pothole or a curb. Looking at FIG. 1A, the shear band 112, which comprises first and second substantially inextensible membranes 114, 116 that are separated by the shear layer 118, can be deformed during such an event, exerting compressive stresses on the top or second membrane 116, as viewed in this figure, and tensile stresses on the first or bottom membrane 114, as viewed in this figure. When this happens, two possible problems with the shear band may occur.

First, as the top or second membrane 116 becomes highly stressed in compression, it becomes prone to buckling. This can cause strains between the polyurethane, which often constitutes the shear layer 118, and the metal cords, which is often part of the membrane, to be excessive. At such a high strain, the bond between the cords and the polyurethane is broken and the cords will buckle and deform plastically. Second, the contact patch may grow sufficiently long that shear layer 118 may experience excessive shear strain, such as 15%, causing the shear layer to deform an undesirable amount. In either case, the problem is irreversible causing the shear band 112 to no longer function as originally designed.

Accordingly, it is desirable to find a construction for a shear band that can withstand higher imposed deformations and still be able to rebound and work properly. It is especially desirable to find such a construction that helps to prevent the plastic deformation of the shear layer and the cords found within the inextensible membrane of the tire that experiences compression and is prone to buckling when the tire hits an obstruction and a large deflection is imposed on the tire.

SUMMARY OF THE INVENTION

Particular embodiments of the present include a tire that defines X, Y and Z directions and that has a tread with a shear band. The shear band comprises a shear layer and at least one substantially inextensible membrane that undergoes compression when the tread is deflected. This membrane has at least one reinforcement that has a cross-sectional area in the YZ plane wherein the moment of inertia of the cross-sectional area about a Y axis that is located at the centroid of this cross-sectional area is different than the moment of inertia about a Z axis that is located at the centroid of this cross-sectional area. These Y and Z axes of the cross-sectional area are parallel to the Y and Z axes of the tire.

In certain cases, the tire comprises a plurality of cross-sectional areas in the YZ plane that each have different moments of inertia about their respective Y and Z axes.

In some embodiments, the moment of inertia of the cross-sectional area about the Y axis is greater than the moment of inertia about the Z axis, predisposing the reinforcement to buckle in the Y direction. In such a case, the cross-sectional shape may be rectangular, defining a major axis that is aligned substantially with the Z direction of the tire. It may also have a width in the Y direction and a height in the Z direction and its aspect ratio, which is the height divided by the width, may be 1.5 and preferably 3.0.

In other embodiments, the moment of inertia of the cross-sectional area about the Z axis is greater than the moment of inertia about the Y axis, predisposing the reinforcement to buckle in the Z direction. In such a case, the cross-sectional shape may be rectangular, defining a major axis that is aligned substantially with the Y direction of the tire. It may also have a width in the Z direction and a height in the Y direction and its aspect ratio, which is the height divided by the width, may be 1.5 and preferably 3.0.

In certain embodiments, the pace or distance from one cross-sectional area to the next is approximately 1.5 mm.

In still other embodiments that have a plurality of cross-sectional areas, there may be an alternating configuration where one cross-sectional area has a greater moment of inertia about its Y axis and the next cross-sectional area has a greater moment of inertia about its Z axis. In such a case, the cross-sectional shapes may be rectangles that have the same dimensions and an aspect ratio, which is the ration of the largest of the height or width of the rectangle divided by the smallest of the height or width of the rectangle, which is at least 1.5 and preferably 3.0.

In some embodiments, the reinforcement is wound spirally around the circumference or X direction of the tire. In other embodiments, the cross-sectional areas are formed by a plurality of reinforcements, which are substantially parallel to each other.

In yet further embodiments that have a plurality of cross-sectional areas, the moment of inertia of these areas about their Z axis is greater than the moment of inertia about their Y axis and there is substantially no gap between them along the Y axis. In these embodiments, there could be a second set of cross-sectional areas that are spaced below the first set of cross-sectional areas a predetermined distance in the Z direction of the tire that also have a moment of inertia about their Z axis that is greater than their moment of inertia about their Y axis. In some of these embodiments, the first set of cross-sectional areas is formed by spirally winding the first reinforcement circumferentially or in the X direction of the tire. Similarly, the membrane may further comprise a second reinforcement that forms the second set of cross-sectional areas by being spirally wound around the circumference or X direction of the tire.

When there are two sets of cross-sectional areas spaced apart from each other, the membrane may comprise an elastomer that is found between the first and second sets of cross-sectional areas and that has a lower young's modulus than the elastomer used in the shear layer.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

The inventors of the present application recognized that one possible solution for preventing irreversible failure of the shear band when it is subjected to large deflections would be to find a construction of the shear band that has a higher buckling stress threshold without adding reinforcing material to the membrane that experiences compression. They also recognized that a second possible solution would be to create a shear band that had a lower buckling stress threshold but that developed lower post-buckled material strains in the shear layer itself and at the elastomer and reinforcing material interfaces so that the bond between the elastomer and reinforcing material would not be as easily broken.

In order to analyze constructions of the shear band that might provide these solutions, a suitable model of the shear band was constructed. The model chosen was a monofilament/elastomer composite that is similar to a continuous fiber classical composite in that the reinforcements are parallel and continuous but is different in four key ways. First, the elastomer modulus is 0.0001 to 0.00001 that of the reinforcement as opposed to a ratio of 0.1 to 0.01 that is typically used for a classic composite. Second, the monofilaments that constitute the substantially inextensible membranes are macroscopic having a diameter or width in the order of 1 mm as opposed to $10\mu$ for a single fiber in a classic composite. Third, the monofilament/elastomer composite can have discrete layers or plies of reinforcement and/or other discontinuities while classical composites assume a constant volume fraction of reinforcement to matrix cross-section across the entire cross-section of the composite. Finally, the monofilament/elastomer composite can have macroscopically large deformations in the elastomer with high strains while classic composites can have large deflections, such as when a long slender beam is bent, but material strains remain small.

Ultimately, the model created and optimized consisted of a monofilament/elastomer composite that has monofilaments used as reinforcing material that were themselves modeled as classical composites.

Validation of Analytical and FEA Models

Figure 1:
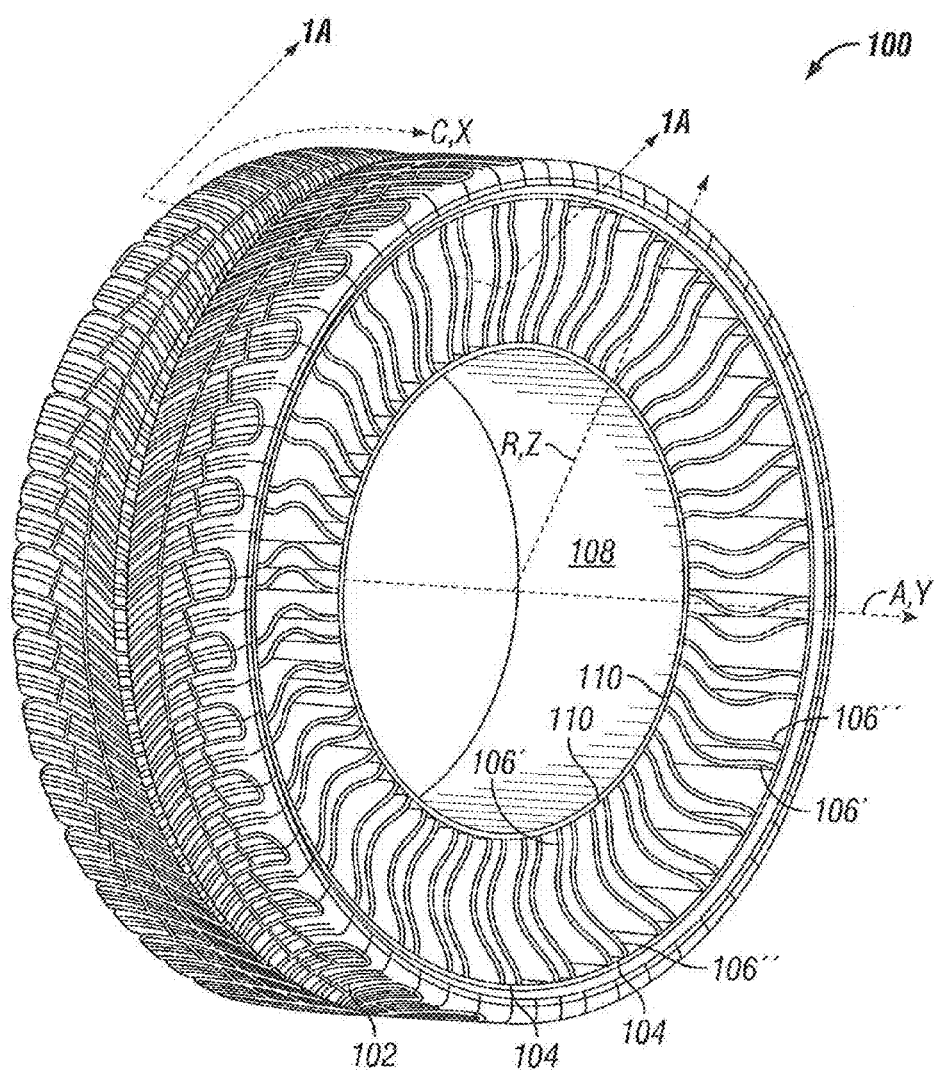
FIG. 1 is a perspective view of a non-pneumatic tire that has spokes and a shear band located in its tread.
Figure 1A:
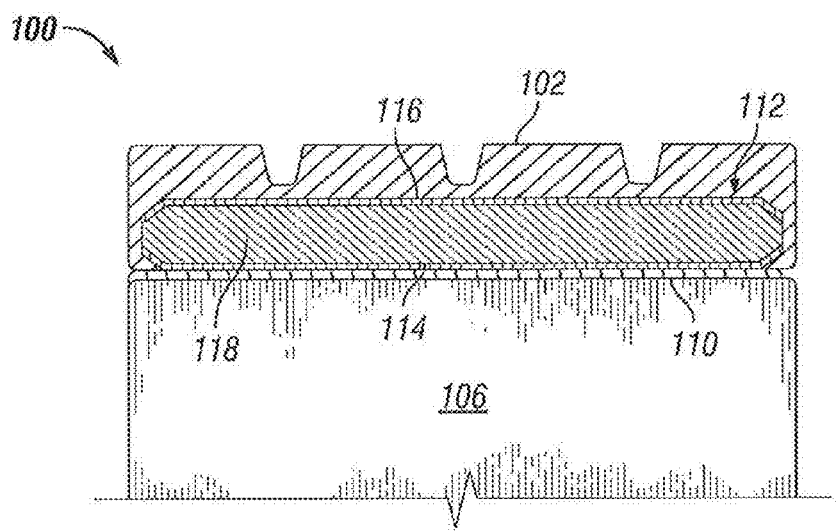
FIG. 1A is sectional view showing the shear band of the tire in FIG. 1 taken along lines 1A-1A thereof.
Figure 2:
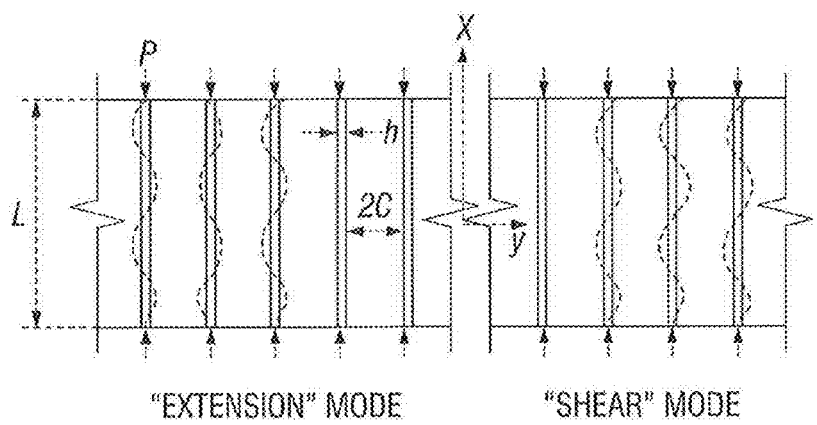
FIG. 2 depicts the extension mode (shown) on the left and shear mode (shown on the right) of a composite subjected to compressive stress.

It is now well-known from the literature that there are extensional and shear deformation modes of a composite under compression. For moderately high filament volume fraction where $v_f > 0.4$, the lowest energy mode is the shear mode (see FIG. 2 for graphical representations of these deformation modes). The equation for calculating the critical composite stress for this mode is:

$$\sigma_c = \frac{G_m}{1-v_f} + \frac{\pi^2 E_f}{12}\left(\frac{mh}{L}\right)^2 v_f \qquad \text{Eq. 1}$$

where $G_m$ is the resin modulus, $E_f$ is the fiber modulus, $v_r$ is the fiber volume fraction, h is the fiber diameter or width and L/m is the buckled fiber wavelength. It is logical to introduce a simplifying assumption that L/m is much greater than h. So, the second term of Eq. 1 can be dropped. Thus, the shear mode critical stress simplifies to:

$$\sigma_c = \frac{G_m}{1-v_f} \qquad \text{Eq. 2}$$

Figure 3:
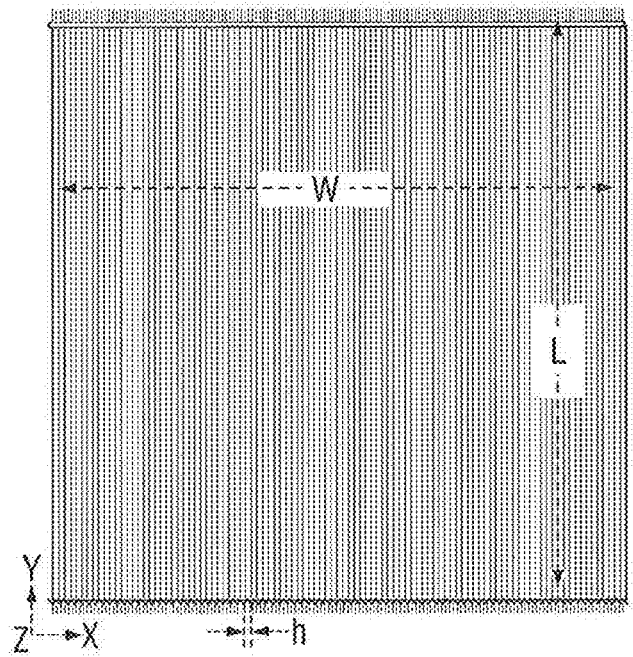
FIG. 3 is a two dimensional (2D) finite element analysis (FEA) model of a composite subjected to uniform compressive stress.

This analytical solution was used as a check for FEA modeling accuracy. Using ABAQUS 6.9, in-plane critical compressive stress was modeled for two-dimensional geometry. Mimicking the above assumptions, the FEA model shown in FIG. 3 was used to model the critical compressive stress when filament diameter h is 1 mm, L is 160.0 mm, W is 160.0 mm, filament modulus is 40,000 MPa, matrix young modulus is 40 MPa, poisson's ratio is 0.5, matrix shear modulus is 13.3 MPa, and $v_f$ is 0.5. For an aspect ratio of one and the given material properties above, $EI/L^2 >> GA$. This means that the model has the requisite properties of a shear band as specified by U.S. Pat. No. 7,201,194.

Figure 4A:
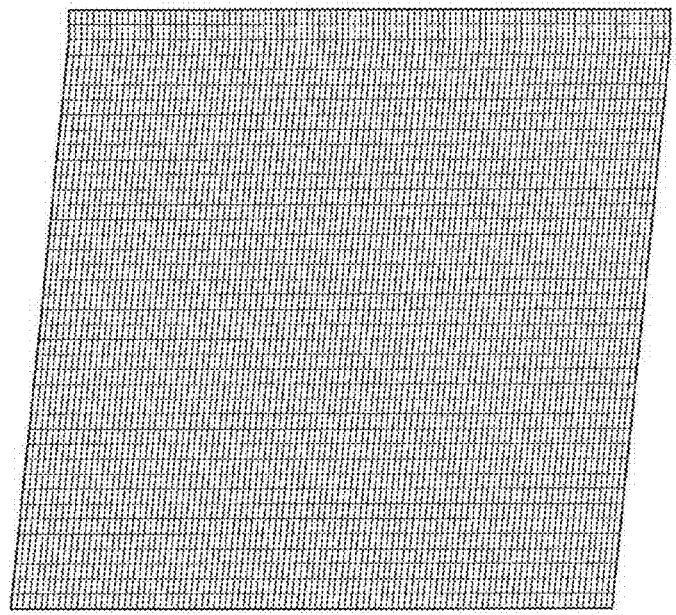
FIGS. 4A thru 4C show different critical buckling stresses and modes for the model shown in FIG. 3.
Figure 4B:
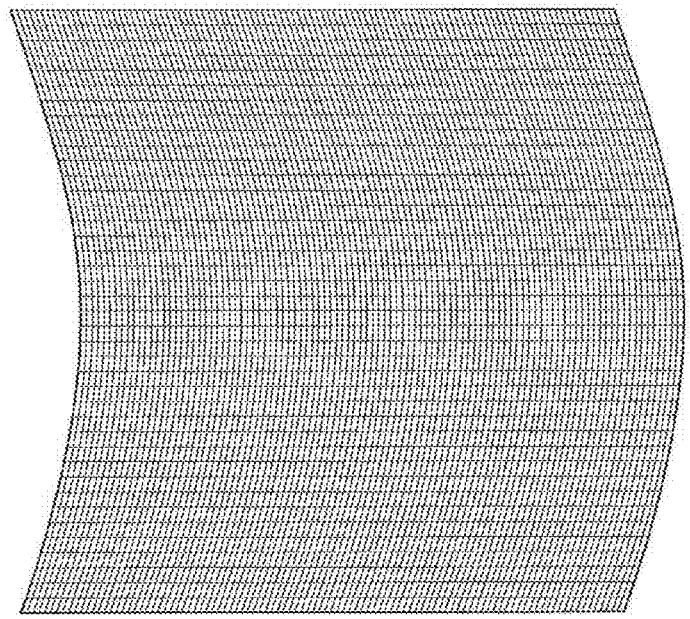
Figure 4C:
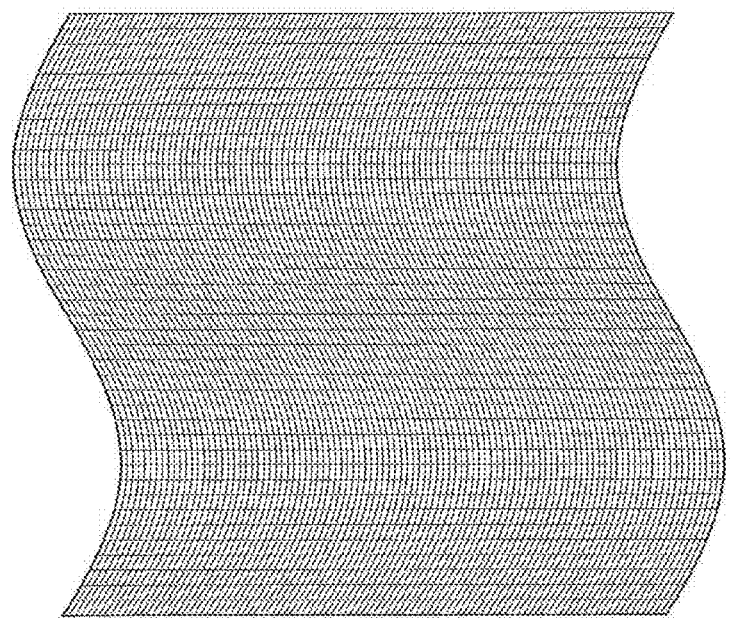

Using quadratic isoparametric elements, a linear perturbation buckling analysis was performed. The first three mode shapes are shown in FIGS. 4A thru 4C, along with the first three eigenvalues (26.9 MPa, 28.8 MPa, and 31.1 MPa for the three modes respectively), which correspond to the critical compressive stress. From Eq. 2, the critical stress should be about 27.6 MPa. As can be seen, there is a 97.5% agreement between the first critical compressive stress of the FEA model and the stress predicted analytically. This shows that the FEA model is capable of predicting in-plane buckling behavior of a shear band and can be used to find configurations of a shear band that can better resist failure when subjected to large deflections.

Figure 5:
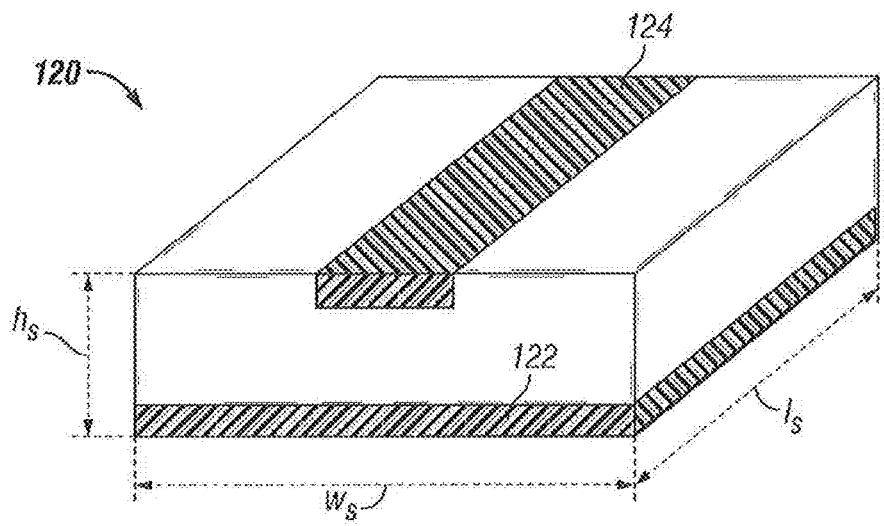
FIG. 5 is a perspective view of a test specimen that is used for predicting out of plane (ZX) buckling.
Figure 6:
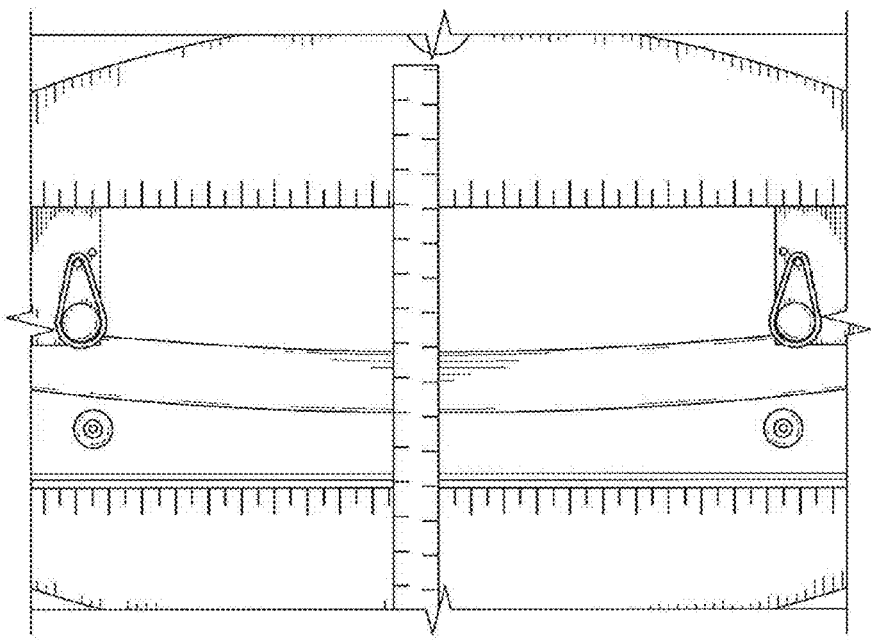
FIG. 6 is a testing apparatus for bending the test specimen of FIG. 5.
Figure 7:
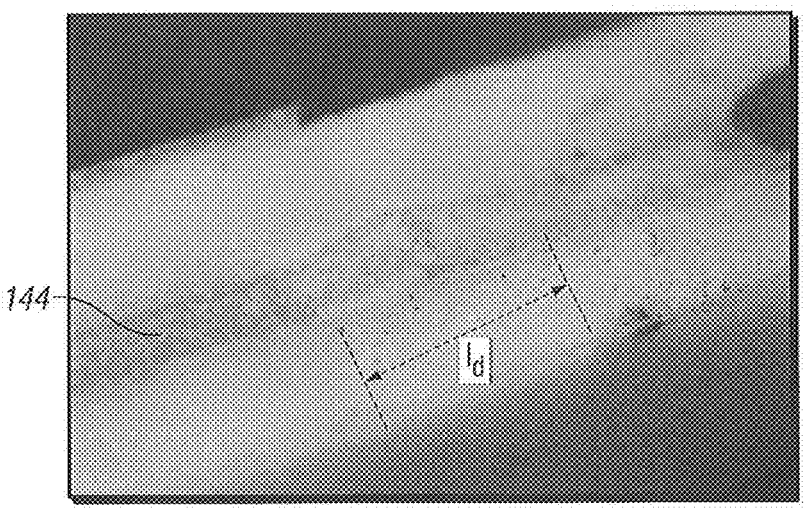
FIG. 7 is an illustration of the buckled strip of the test specimen of FIG. 5.

Furthermore, a test sample was made to see how well the FEA model was able to model out of plane buckling in a real world situation. The test sample 120 as shown in FIG. 5 was a sandwich beam with a length $l_s$ of 300 mm, width $w_s$ of 30 mm and height $h_s$ of 18 mm. The bulk of the sample was made from polyurethane having a young's modulus of 40 MPa. A layer 122 of glass reinforced vinyl ester resin that was 0.7 mm thick was applied to the entire bottom surface of the sample while a narrow strip 124 that was 7 mm wide and 0.7 mm thick was attached to the middle of the top surface of the sample. This sample was then tested as shown in FIG. 6 in a four point testing apparatus. The composite beam was asymmetrically designed such that the neutral fiber occurred close to the 30 mm wide composite plaque 122. The beam was then oriented in the testing apparatus such that the 7 mm wide strip 124 was solicited in compression as the beam was bent. The strip 124 failed at a compressive stress of 420 MPa, calculated using the standard bending stress formula of σ=MZ/I. The failed area is shown in FIG. 7 and the length of the delaminated area. $l_d$ was approximately 20 mm. This failure was due to a buckling event of a beam on an elastic foundation.

Figure 8:
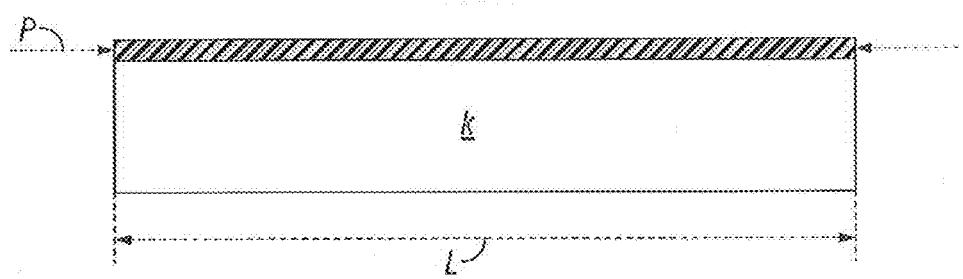
FIG. 8 is a side view of the beam that defines the variables used in Eq. 3.

This scenario has also been predicted analytically by an equation, originally given by Timoshenko in the literature. This equation is:

$$P_c = n^2 \frac{\pi^2 E_b I}{L^2} + \frac{kL^2}{n^2 \pi^2} (n = 1, 2, \dots) \qquad \text{Eq. 3}$$

where n is the number of half sine waves required to give the lowest buckling load, L is the specimen length, $E_b$ is the panel modulus, I is the panel moment of inertia, and k is the foundation modulus (see also FIG. 8). The test sample resulted had an 80 mm portion that experienced pure moment. Over this length, the flexural stress was constant. If this value is used for L and a half-sine distance of 20 mm, which corresponded to what was seen on the test specimen in FIG. 7, is assumed, the calculated $P_c$ according to Eq. 3 is 1773 N. Therefore, the stress as calculated using σ=$P_c$/Area is 362 MPa. This value compares well to the calculated buckling stress of 420 MPa determined experimentally.

Figure 9:
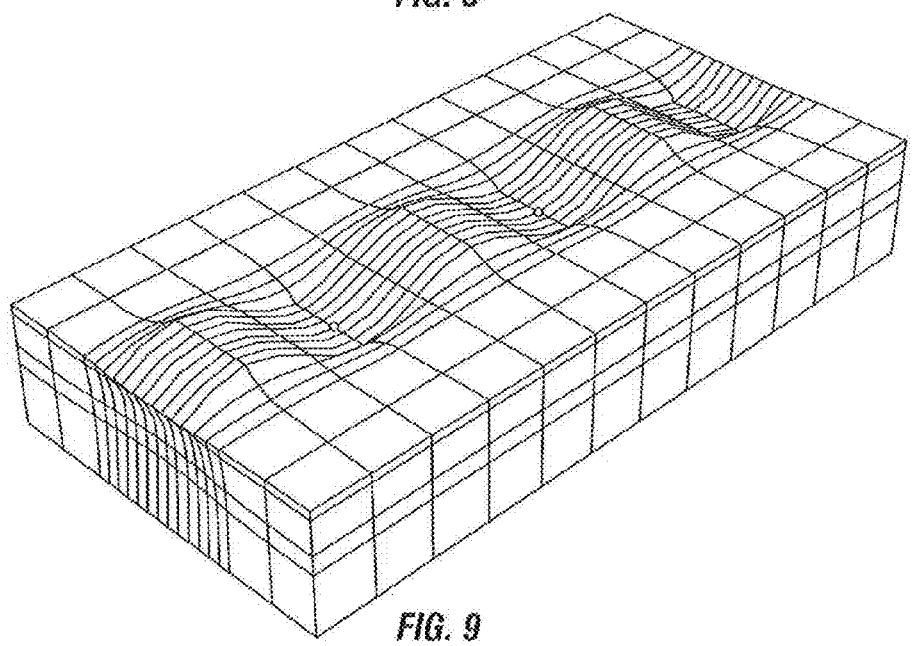
FIG. 9 is a three dimensional (3D) FEA model that simulates the behavior predicted by Eq. 3.

Finally, the inventors constructed a simplified three dimensional ABAQUS model to further study this behavior. Quadratic elements with reduced integration were used. Material properties of the glass composite were considered linear and isotropic with Young's modulus being 40,000 MPa and poisson's ratio being 0.3. The polyurethane was also considered Hookean and linear with Young's modulus being 40 MPa and poisson's ratio being 0.45. A simple linear perturbation buckling analysis was performed. Model geometry with the first mode deformation is shown in FIG. 9. The buckling stress for the first mode was 380 MPa, which agrees well with both analytical and empirical results. Also, the period of the sinusoidal buckled wave matched the delaminated region of the sandwich beam as it was approximately 20 mm for the half period. Therefore, the FEA model is validated for the computation of in-plane (2D) and out of plane (3D) buckling behavior of high modulus filaments in an elastomeric matrix.

Proposed Solutions for Providing Intelligent Buckling in a Shear Band

Figure 10:
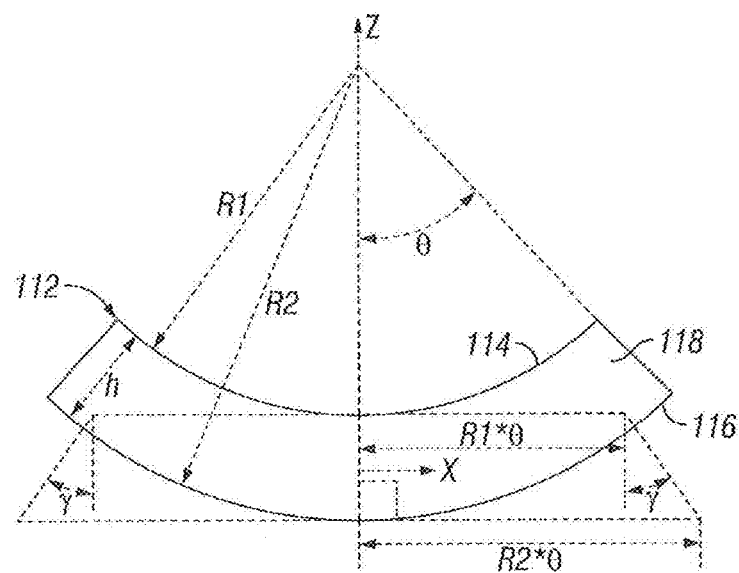
FIG. 10 is a side view showing the shape of a shear band in use.

The contact region of a non-pneumatic tire that has a shear band 112 is shown schematically in FIG. 10. The gray portion is the shear layer 118, which is bounded by membranes 114, 116 that have high circumferential stiffness. When this curved beam is mapped onto contact with a flat surface, three important stress fields occur. First, contact pressure acts on the lower surface. Second, the shear layer develops shear stress, which increases in the X direction as defined by the figure. If the contact length is relatively small compared to the radius R2, and if the shear modulus of the shear layer is relatively constant, then both the shear stress and shear strain increase linearly in direction X. Third, the two high stiffness membranes also develop stress. The bottom membrane 116, as viewed in this figure, develops compressive stress and the top member 114, as viewed in this figure, develops tensile stress.

The inventors found it more convenient to use an analogous structure when creating the model given the way the ABAQUS software works. This analogous structure involves bending a straight beam onto a curved surface instead of bending a curved beam onto a flat surface. This model represents the reversal of the phenomenon that a tire experiences when it experiences a deformation and is acceptable because it gives equal and opposite results. The radius of the cylinder onto which the beam is bent is analogous to the radius of the tire.

Figure 11A:
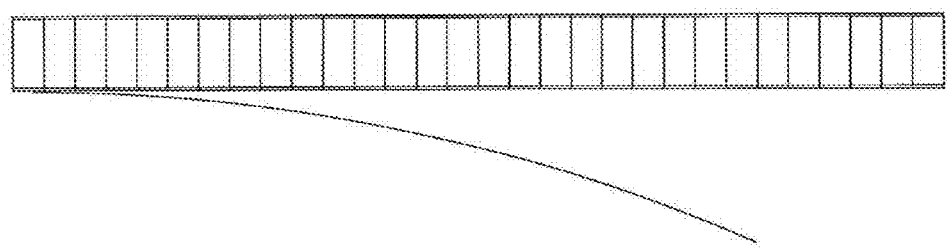
FIG. 11A is a side view of a FEA model of a shear band in an undeflected state.
Figure 11B:
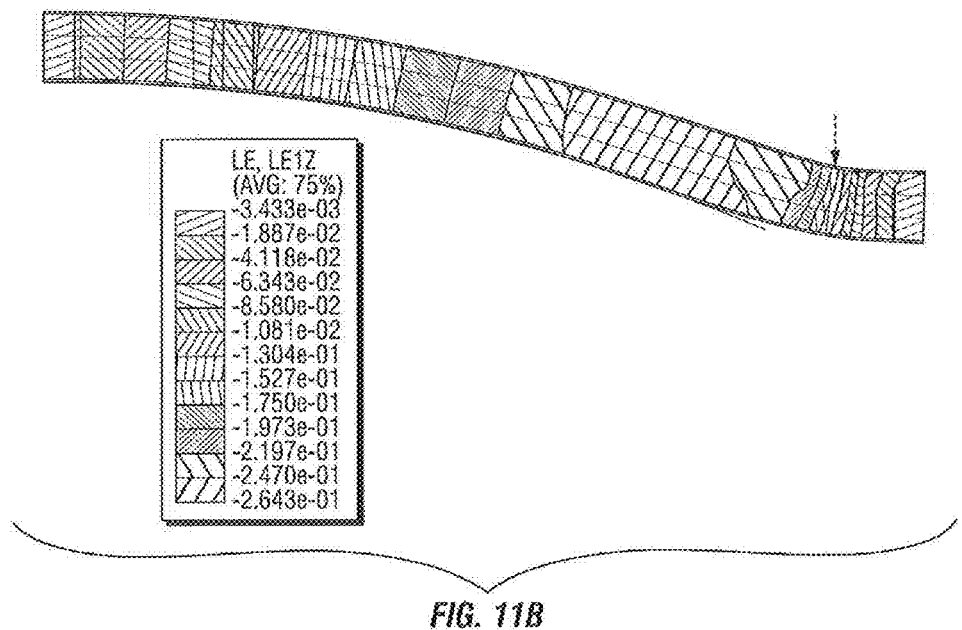
FIG. 11B is a side view of the FEA model of FIG. 11A that is loaded and deflected to simulate the stresses exerted on a shear band in use.

Looking at FIGS. 11A and 11B, the straight and deformed beam models created in ABAQUS 6.9 are shown respectively. Quadratic, isoparametric elements that do not have reduced integration were used. The beam had the following dimensions and properties. The shear layer is 11 mm thick and has a shear modulus, G, of 12 MPa. This shear modulus represents that of a typical thermoset polyurethane elastomer such as that sold under the trademark VIBRATHANE B-836. The substantially inextensible membranes are each 0.4 mm thick and have a young's modulus, E, of 400,000 MPa. This modulus is twice that of steel and was set this high to illustrate the effect of substantial inextensibility. The length of the beam is 150 mm and the radius of the cylinder is 300 mm. By applying a force near the right side of the beam as shown in FIG. 11B, the beam bends into contact with the cylinder. The contours indicate the level of shear strain in the shear layer.

Figure 12:
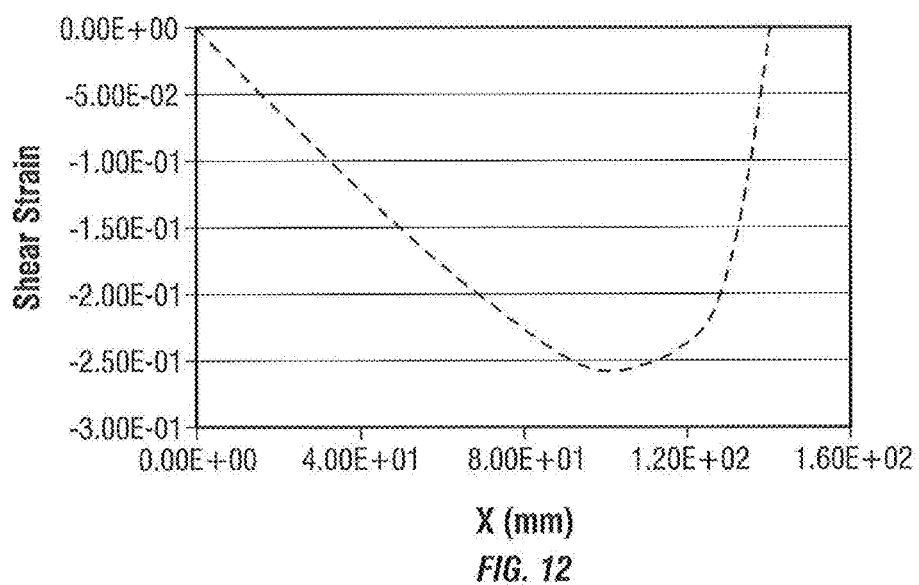
FIG. 12 is a graph showing the shear strain versus X distance for a membrane used in a shear band per the model of FIG. 11B.

The shear strain for this case versus linear position X of the beam is plotted graphically in FIG. 12. The curve is linear until it reaches near the point where the beam leaves contact with the cylinder. In the linear region the shear strain varies as X/R (where R is the radius of the cylinder). Thus, at X=40 mm, the shear strain is 0.13 and the maximum shear strain is approximately 0.26 at X=95 mm. A thermoset elastomer such as B-836 can withstand repeated strain cycles up to a shear strain of 0.15 without permanent deformation. So, for this case a contact patch length of over 90 mm represents a severely overloaded condition that would result in the failure of the shear band.

Figure 13:
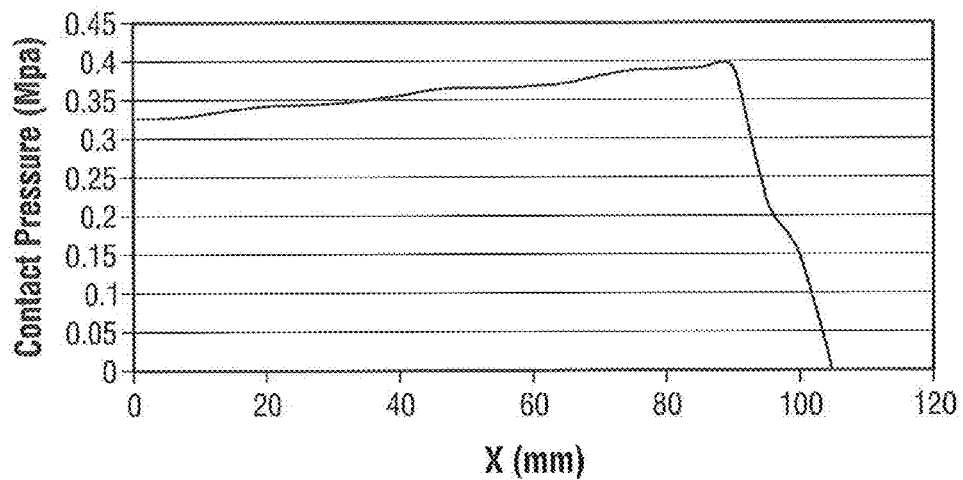
FIG. 13 is a graph showing the contact pressure versus X distance for a membrane used in a shear band per the model of FIG. 11B.

In like fashion, the predicted contact pressure for this case is shown in FIG. 13. This pressure can be predicted by the following equation that is known in the literature for non-pneumatic tires:

$$P = \frac{Gh}{R} \qquad \text{Eq. 4}$$

where G is the shear modulus of the shear layer, h is the thickness of the shear layer and R is the radius of curvature to the outer membrane. Hence for this case, this equation predicts a pressure of 0.44 MPa. Looking at the graph, this value is predicted by the model as being almost obtained at X=90 mm. Then, the contact pressure slightly decrease as X approaches zero as predicted by the FEA model. The reason for this decrease in pressure, which is a deviation from constant pressure predicted by Eq. 4, is that the membranes are not completely inextensible as Eq. 4 assumes, so some strain occurs in the membranes. This phenomenon is described as the "shear efficiency factor" in the literature.

Figure 14:
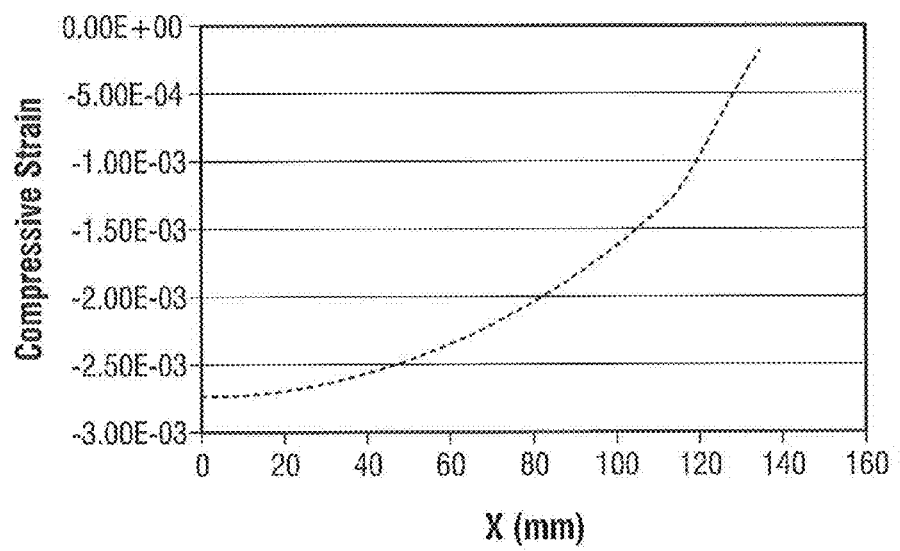
FIG. 14 is a graph showing the compressive strain of the bottom membrane of the model of FIG. 11B versus X distance.

Turning now to FIG. 14, the compressive strain in the top membrane (as viewed in FIG. 11B) as a function of distance X is plotted graphically. The strain in the top membrane reaches −0.0027 at the center of contact, where X=0, which shows that the membranes are not completely inextensible or else the strain would be zero and the contact pressure would be 0.44 MPa at this location while the shear strain at the edge of contact would be even greater.

As stated previously, while efficient, very stiff membranes result in high shear layer strain, especially when the shear band is subject to large deflections and the contact patch becomes very long. Consequently, an ideal membrane would have a high initial modulus up to a normal operating condition, low modulus at higher strains and capacity for operating at high strains without damage. In other words, the shear band can return to normal operation after an overload or impact event occurs to the tire which creates large deflections on the tread and shear band of the tire. Known materials do not have these characteristics so the inventors proceeded to model shear bands with different configurations using ABAQUS 6.9 with quadratic, isoparametric elements without reduced integration to see if a shear band that has these desirable characteristics could be constructed.

Figure 15:
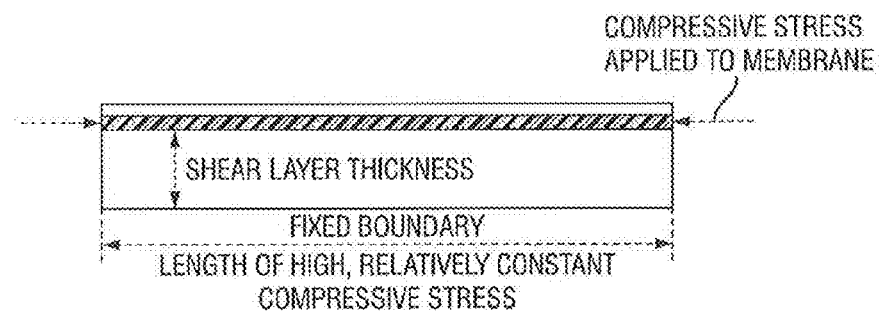
FIG. 15 is a side view of a model of shear band showing what loads and boundary conditions are applied to the FEA model.

The inventors constructed a model with a fixed bottom surface and applied a compressive stress to the membrane to find the critical buckling load of a shear band. This general model is depicted in FIG. 15.

Figure 16A:
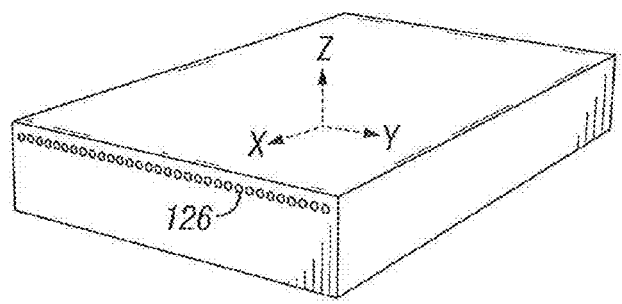
FIGS. 16A thru 16E show different configurations of shear bands used to determine which configurations provide intelligent buckling of a membrane under compression.

The inventors then proceeded to make changes to this model to predict the behavior of shear bands having different configurations. FIG. 16A, shows the configuration of a prior configuration of a shear band where a single round reinforcement 126 that is spirally wound around the circumference of a tire and that has a diameter of 0.98 mm and a pace of 1.5 mm as shown in the cross-section. It should be noted that it is not essential that a single reinforcement be spun around the circumference of a tire that separate reinforcements that are spaced away from each other in the Y or axial direction of a tire could be used. For this case, a glass fiber impregnated into a vinyl ester resin was used with a volume fraction of 0.5 and the modulus of the monofilament is 40,000 MPa. This model served as a reference (hereafter referred to as model A) to see what improvements could be obtained.

Figure 16B:
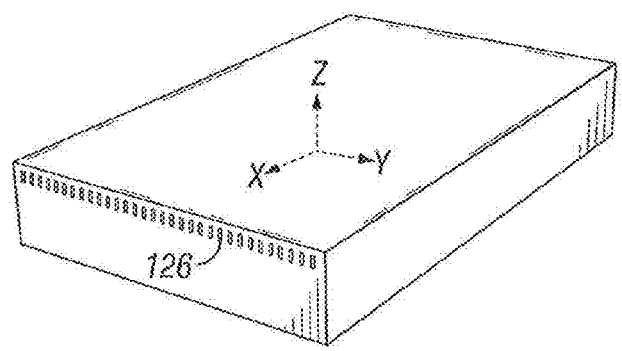

An improved design is shown in FIG. 16B (hereafter referred to as model B). This design has a reinforcement 126 with a rectangular cross-section in which the major axis is vertical and its dimensions are 1.5 mm tall and 0.4 mm wide. The pace from one cross-section to the next is 1.5 mm. The total area, and therefore the total modulus in the X or circumferential direction is the same as the reference model shown in FIG. 16A.

Figure 16C:
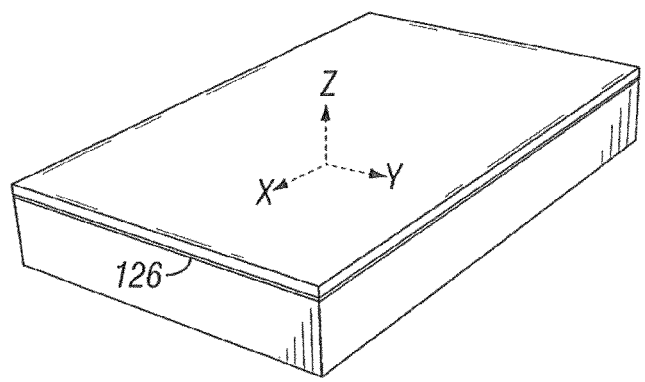

A third design is shown in FIG. 16C (hereafter referred to as model C). This design is the same as that shown in FIG. 16B except that the filaments 126 are oriented such that the major axis is the horizontal, axial or Y direction. The filaments are 0.2 mm tall and 1.5 mm wide with a pace that is also 1.5 mm. Due to the pace and size of the filaments, there is no horizontal spacing between them as is usually present when using spiral winding.

Figure 16D:
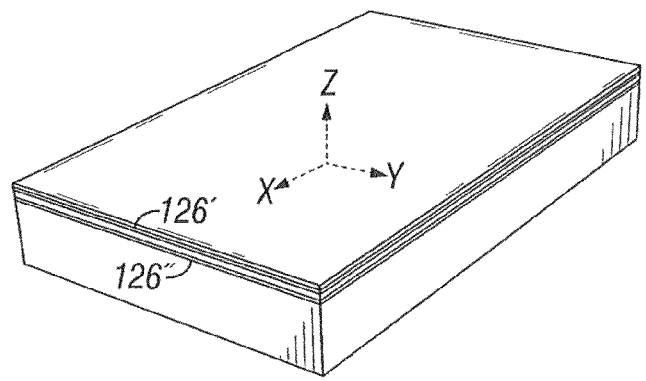

A fourth design is illustrated in FIG. 16D (hereafter referred to as model D). This model is identical to that shown in FIG. 16C except that are two layers of reinforcement 126', 126". Thus, the membrane comprises two layers of spirally wound monofilaments that are spaced 1 mm away from each other in the vertical, radial or Z direction.

Yet a fifth design is also represented by FIG. 16D (hereafter referred to as model E. Its geometry is the same as the fourth design but the modulus of the intra membrane elastomer found between the two layers of reinforcement is 18 MPa instead of 36 MPa, which is the modulus of the elastomer found in the shear layer.

Figure 16E:
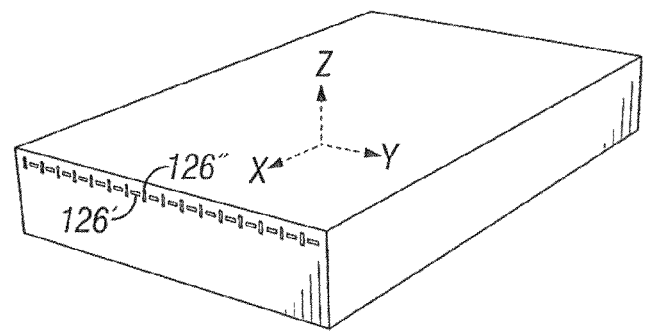

Finally, a sixth model is depicted in FIG. 16E (hereafter referred to as Model F) and is a combination of the models shown in FIGS. 16B and 16C created by alternating the orientation of the major axis of the monofilament rectangles 126', 126". The pace remained 1.5 mm meaning that the membrane modulus was identical for all models.

For all of these scenarios, the glass monofilament can be extruded into a rectangular shape and then embedded into a skim of elastomer and then wound onto the tread of the tire. Alternatively, separate monofilaments could be co-extruded within an elastomer and then wrapped around the circumference of the tire as a semi-finished good.

The inventors then performed standard linear buckling bifurcation analysis that is available in ABAQUS 6.9 on each of the models. The length of the models in the X or circumferential directions was chosen to be 80 mm as this represents the length over wick the compressive stress maintains a relatively constant value. Note that the beam model shown in FIG. 9 is only half of the actual contact surface since 40 mm is the half length. The pertinent buckling modes are shown in FIGS. 17A thru 17D. The reference model A showed a critical buckling stress of 340 MPa where the buckling happened in the XY plane although there was a small XZ component (see FIG. 17A). The second model (model B) had a critical buckling stress of 272 MPa where the buckling happened in the XY plane alone (see FIG. 17B). The third design (model C) has a critical buckling stress of 277 MPa where the buckling happened in the XZ plane, the fourth design (model D) had a critical buckling stress of 203 MPa with buckling also occurring only in the XZ plane and the fifth design (model E) had a critical buckling stress of 176 MPa where the buckling only occurred in the XZ plane (see FIG. 17C). Finally, the six model (model F) as shown by FIG. 17D buckled geometrically in the same as the reference model but with a much higher critical buckling stress of 448 MPa and an even greater XZ component.

As can be seen from these modeling results, the cross-sectional shape of the reinforcements plays a very significant role in the critical buckling stress even when the total cross-sectional area, and therefore the circumferential or X stiffness component of the reinforcement, remains the same between different configurations. It also has a large role in determining the character of the buckling mode such as what plane or planes the reinforcements buckle when the critical buckling stress is reached.

Next, the inventors used the Riks method that is included in ABAQUS 6.9 to model the post buckling behavior. This procedure works by introducing an imperfection into the model that is generally associated with a particular buckling mode of interest. The Riks method then incrementally adds a force or stress, deforming the structure in a prescribed direction until some criterion is reached. For the problem at hand, the inventors added an imperfection corresponding to the models shown and described above. The maximum imperfection was 0.5 mm, with all other node displacements scaled accordingly. The load was a compressive stress in the X direction applied to the reinforcement. The Riks procedure then returned X displacement as a function of applied X stress.

Figure 17A:
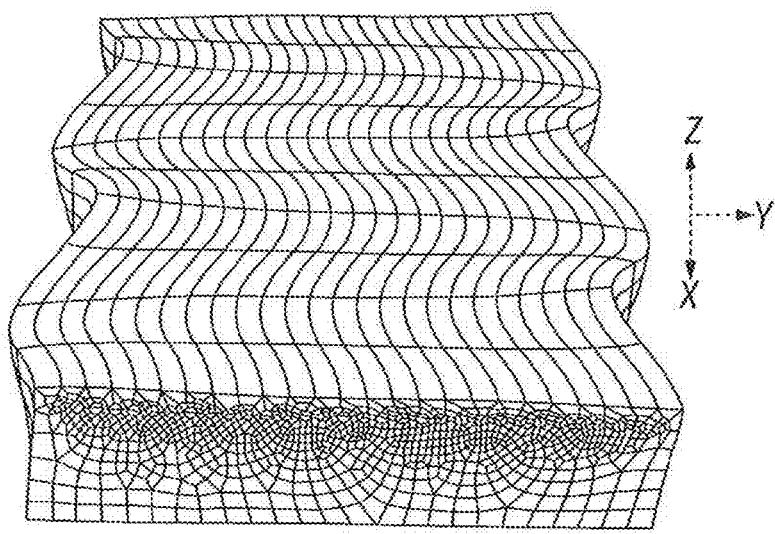
FIGS. 17A thru 17D show the buckled versions of the FEA models shown in FIGS. 16A thru 16E.
Figure 17B:
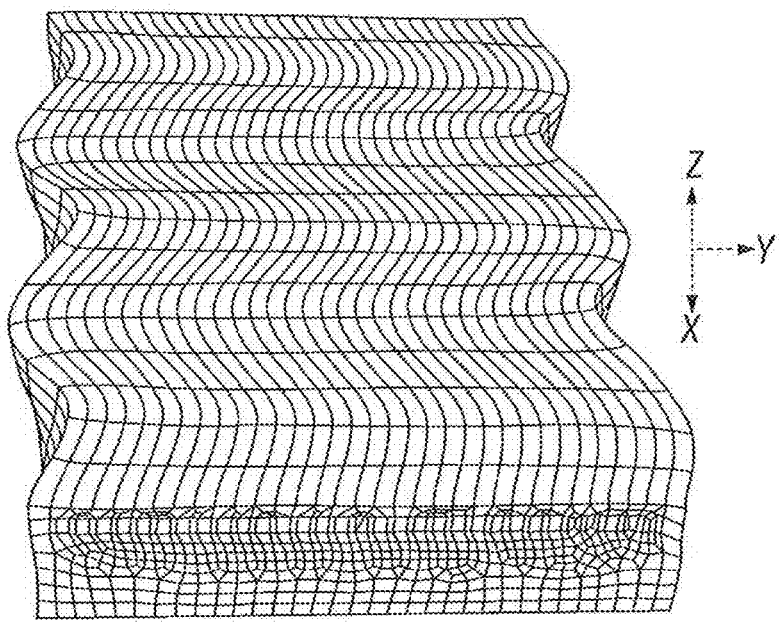
Figure 17C:
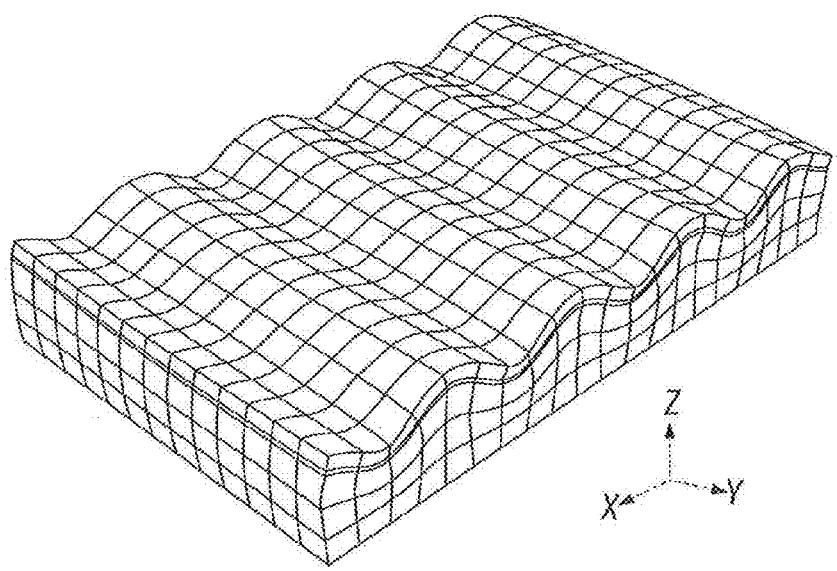
Figure 17D:
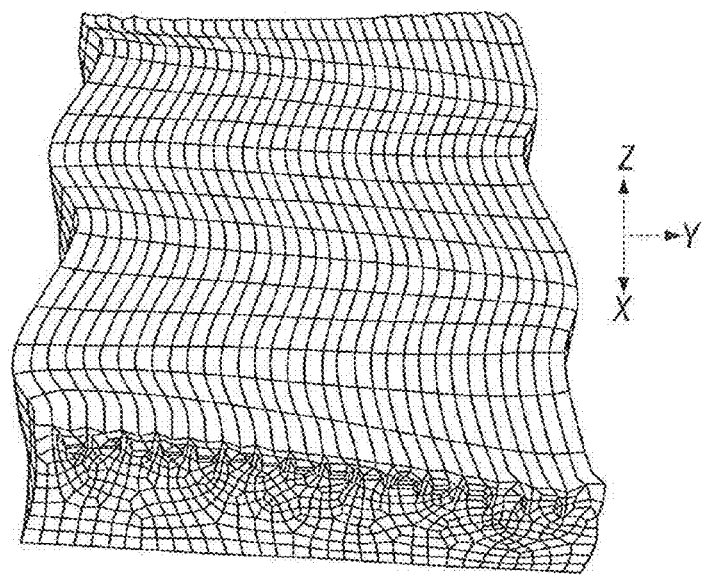
Figure 18:
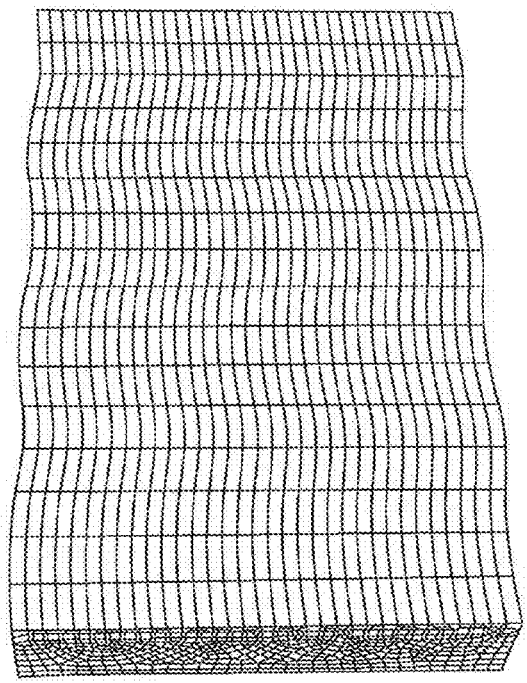
FIGS. 18 and 19 are input and output models respectively associated with the Riks analysis for determining post buckling behavior of a shear band.

For example, FIG. 18 shows the post buckle geometry of model B shown in FIGS. 16B and 17B that was used as an input for the Riks procedure. This geometery reflects the physical state at the moment immediately after the critical stress is reached. Maximum node displacements are 0.5 mm, with other displacements scaled accordingly. This model, the critical stress was 272 MPa. Subsequent compressive stress applied to the reinforcement produced a compressive deformation. The Riks procedure automatically applies this incremental stress.

Figure 19:
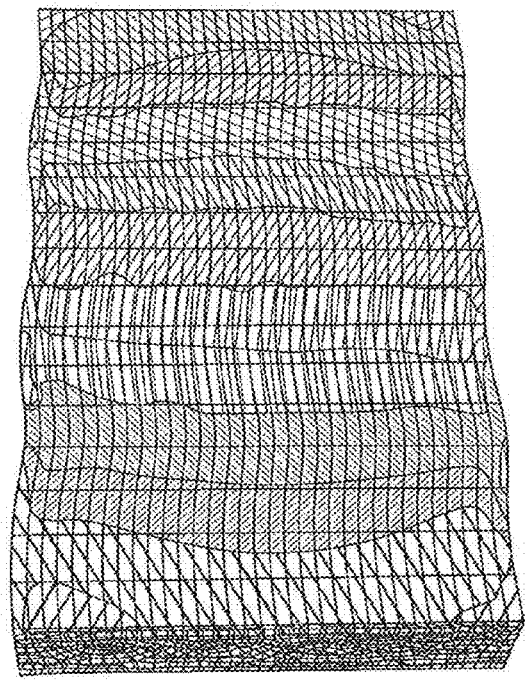

FIG. 19 shows a deformed geometry that resulted from the Riks analysis. Nodal displacements for the case of 150 MPa of additional compressive stress are shown by the contour plots. For this case, the reinforcement displacement was about 0.23 mm in the X direction. From this displacement, noting that half period was 40 mm, a reinforcement strain is calculated to be 0.0057. So a compressive stress of 150 MPa gives a compressive strain of 0.0057. In this way, the post-buckled stiffness can be calculated from employing the Riks method. Similarly, this method was applied for each of the models described above.

Figure 20:
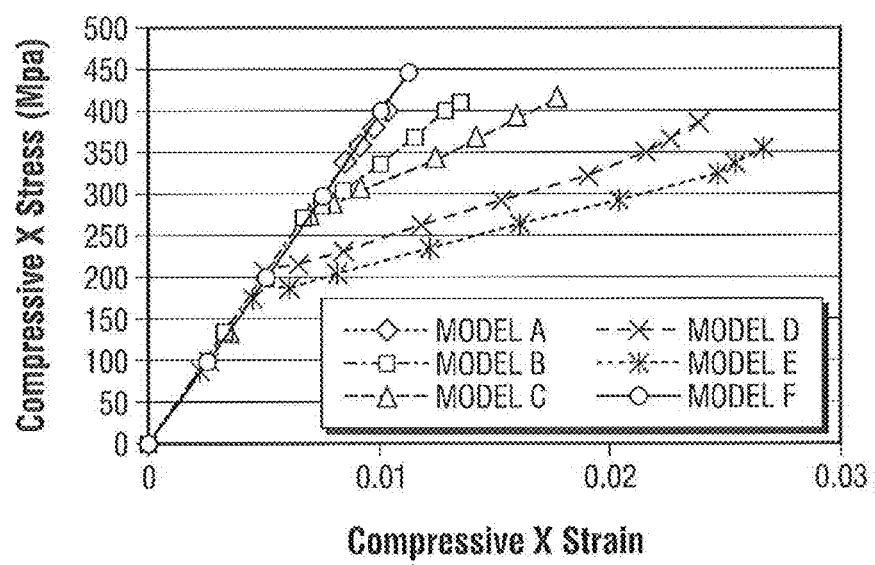
FIG. 20 is a graph that shows the stress versus strain curves of the models shown in FIGS. 16A thru 16E showing that some models exhibit intelligent buckling.

FIG. 20 shows a graph that shows the stress versus strain for each of these models. Before the critical buckling stress, each model has the same modulus. All the models except for model F buckle and then exhibit different effective compressive moduli. The compressive buckling stress for Model F was so high that we consider that this cable orientation will not buckle. This information is also presented below in table 1.

TABLE 1

| Model | Pre-buckle compressive modulus | Critical buckling stress | Post buckle effective compressive modulus | Percent modulus reduction compared to A |
|---|---|---|---|---|
| A | 40,000 MPa | 340 MPa | 32,300 | 0% |
| B | 40,000 | 272 | 21,300 | 34% |
| C | 40,000 | 277 | 13,070 | 59% |
| D | 40,000 | 203 | 8,990 | 72% |
| E | 40,000 | 177 | 7,320 | 77% |
| F | 40,000 | 448 | n/a | 0% |

This data demonstrates that the compressive behavior of reinforcement in a membrane of the shear band can be drastically altered while keeping constant the amount of the reinforcement. Compared to the reference model A, model F increases the buckling stress by 32% while models C that E show reductions in the effective moduli and/or reductions in the critical buckling stress. Thus, these models appear to be able to provide intelligent buckling in the shear band.

Proposed Solutions for Providing Intelligent Buckling in a Shear Band

Figure 21:
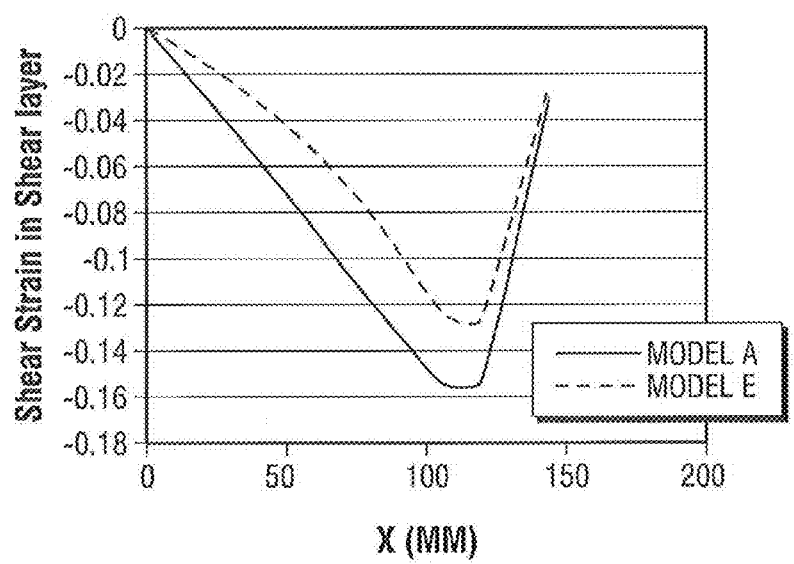
FIG. 21 is a shear strain versus X distance graph of models A and E shown in FIG. 16A and FIG. 16D respectively.

A comparison of reference model A to model E shows the beneficial effect of this compressive behavior on shear strain. For model E, the compressive membrane with the intelligent buckling behavior was used while its membrane that experiences tension has a 40,000 MPa modulus. Shear strain versus X is shown for both models in FIG. 21. The shear strain is reduced in model E to 0.13, which is below the 0.15 strain that is associated with failure of the shear band. This is attributable to buckling of the membrane under compression, which alleviates the amount of strain that occurs in the shear layer. This is 22% less than the maximum shear experienced by model A.

Figure 22:
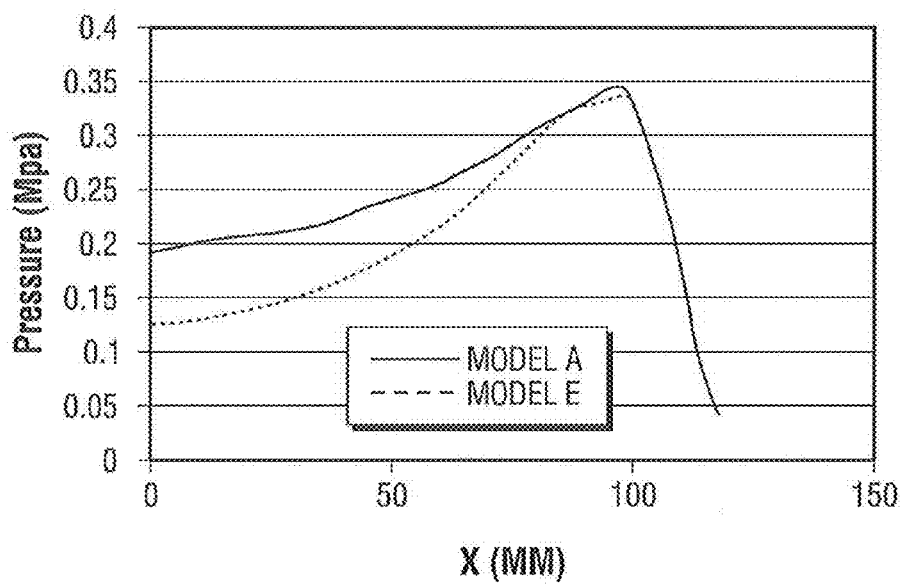
FIG. 22 is a graph showing the contact pressure versus X distance of models A and E shown in FIG. 16A and FIG. 16D respectively.

Likewise, there is also a reduction in contact pressure for model E as compared to model A. FIG. 22 indicates under a loading condition where the tread is deformed so that the length of the contact patch reaches at least 200 mm. This corresponds to an impact situation as mentioned earlier. As can be seen, there is a reduction in the total amount of contact pressure in the footprint, which translates into a reduced impact load as calculated by integrating this contact pressure over the area of the footprint. Hence, the intelligent buckling of the shear band mimics the performance of having an internal suspension system in the tire. This provides a critical or unexpected result that is absent from the prior art. Consequently, model E develops 18% less load than model A indicating that a tire using intelligent buckling technology will experience a reduction in impact load as compared to a tire using conventional technology.

While only a shear band that is part of a non-pnuematic tire with spokes has been specifically described herein, it is contemplated that this construction could be used with tires that use a gas along with a shear band (often referred to as a hybrid tire) to support the load applied to the tire. In such a case, sidewalls may be substituted for spokes. Also, other materials may be used instead of polyurethane such as any thermoset or thermoplastic material that is suitably durable and strong to support the loads applied to the tire.

Figure 23A:
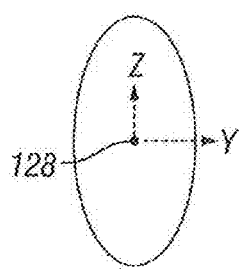
FIGS. 23A thru 23C shows various cross-sections as examples of configurations of the reinforcement(s) that could be used with the present invention such as an ellipse, rectangle and an arbitrary shape.
Figure 23B:
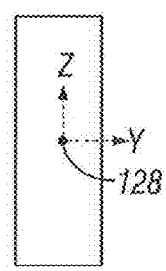
Figure 23C:
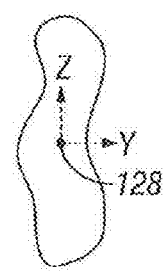

While this invention has been described with reference to particular embodiments thereof, it shall be understood that such description is by way of illustration and not by way of limitation. For example as shown by FIGS. 23A thru 23C, other cross-sections than rectangular could be used for the reinforcements including elliptical or any other shape that has different moments of inertia about the Z and Y axes that are positioned at the centroid of the cross-section and that are parallel to the Z and Y directions respectively of the tire. Accordingly, the scope and content of the invention are to be defined only by the terms of the appended claims.

What is claimed is:

1. A tire defining X, Y and Z directions having a tread and a shear band wherein the shear band comprises a shear layer and at least one substantially inextensible membrane that undergoes compression when the tread is deflected, said membrane having at least one reinforcement that has a cross-sectional area in the YZ plane wherein the moment of inertia of the cross-sectional area about a Y axis that is located at the centroid of this cross-sectional area is different than the moment of inertia of the cross-sectional area about a Z axis that is located at the centroid of this cross-sectional area wherein said Y and Z axes of the cross-sectional area are parallel to the Y and Z axes of the tire, wherein said at least one reinforcement is wound around the circumference or X direction of the tire spirally.

2. The tire of claim 1 wherein said membrane comprises a plurality of cross-sectional areas in the YZ plane wherein the moment of inertia of each cross-sectional area about a Y axis that is located at the centroid of that cross-sectional area is different than the moment of inertia of that cross-sectional area about a Z axis that is located at the centroid of that cross-sectional area wherein said Y and Z axes of the cross-sectional areas are parallel to the Y and Z axes of the tire.

3. The tire of claim 1 wherein the moment of inertia of the cross-sectional area about the Y axis is greater than the moment of inertia about the Z axis, predisposing the reinforcement to buckle in the Y direction.

4. The tire of claim 3 wherein the cross-sectional area is rectangular, defining a major axis that is aligned substantially with the Z direction of the tire and a width in the Y direction and a height in the Z direction, wherein the aspect ratio, which is the height divided by the width, is at least 1.5 and preferably 3.0.

5. The tire of claim 1 wherein the moment of inertia of the cross-sectional area about the Z axis is greater than the moment of inertia about the Y axis, predisposing the reinforcement to buckle in the Z direction.

6. The tire of claim 5 wherein the cross-sectional area is rectangular, defining a major axis that is aligned substantially with the Y direction of the tire and a height in the Y direction and a width in the Z direction, wherein the aspect ratio, which is the height divided by the width, is at least 1.5 and preferably 3.0.

7. The tire of claim 2 wherein each adjacent said cross-sectional area is separated along the Y-axis at a pace of approximately 1.5 mm.

8. The tire of claim 2, wherein the plurality of cross-sectional areas comprises an alternating configuration where one cross-sectional area has a greater moment of inertia about its Y axis and the next cross-sectional area has a greater moment of inertia about its Z axis.

9. The tire of claim 8 wherein the cross-sectional shapes are rectangles having the same dimensions and an aspect ratio, which is the ratio of largest of the height or width of the rectangle divided by the smallest of the height or width of the rectangle, which is at least 1.5 and preferably 3.0.

10. The tire of claim 2 wherein the cross-sectional areas are formed by a plurality of reinforcements, which are substantially parallel to each other.

11. The tire of claim 2 wherein each of the cross-sectional areas has a moment of inertia about their Z axis, which is greater than their moment of inertia about their Y axis and are configured to have substantially no gap between them along the Y axis.

12. The tire of claim 11, wherein said membrane further a second set of cross-sectional areas that are a spaced below the first set of cross-sectional areas a predetermined distance in the Z direction of the tire, wherein each of the cross-sectional areas of the second set has a moment of inertia about their Z axis, which is greater than their moment of inertia about their Y axis and are configured to have substantially no gap between them along the Y axis.

13. The tire of claim 12 wherein the first set of cross-sectional areas is formed by spirally winding the first reinforcement circumferentially or in the X direction of the tire and wherein the membrane comprises a second reinforcement that forms the second set of cross-sectional areas by being spirally wound around the circumference or X direction of the tire.

14. The tire of claim 12 wherein the membrane comprises an elastomer that is found between the first and second sets of cross-sectional areas and that has a lower young's modulus than the elastomer used in the shear layer.

* * * * *